(12) United States Patent
Cho et al.

(10) Patent No.: US 9,310,612 B2
(45) Date of Patent: Apr. 12, 2016

(54) MOBILE DEVICE, HEAD MOUNTED DISPLAY AND METHOD OF CONTROLLING THEREFOR

(71) Applicant: LG ELECTRONICS INC., Seoul (KR)

(72) Inventors: Eunhyung Cho, Seoul (KR); Sinae Chun, Seoul (KR); Jongho Kim, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 14/019,085

(22) Filed: Sep. 5, 2013

(65) Prior Publication Data

US 2015/0015459 A1 Jan. 15, 2015

(30) Foreign Application Priority Data

Jul. 10, 2013 (KR) .................. 10-2013-0081138

(51) Int. Cl.
*G09G 5/00* (2006.01)
*G02B 27/01* (2006.01)
*G06F 3/00* (2006.01)
*G02B 27/00* (2006.01)

(52) U.S. Cl.
CPC .......... *G02B 27/017* (2013.01); *G02B 27/0093* (2013.01); *G06F 3/00* (2013.01)

(58) Field of Classification Search
None
See application file for complete search history.

(56) References Cited

U.S. PATENT DOCUMENTS

| | | | |
|---|---|---|---|
| 8,427,396 B1* | 4/2013 | Kim | 345/8 |
| 2012/0218171 A1 | 8/2012 | Fujigaki | |
| 2012/0249416 A1 | 10/2012 | Maciocci et al. | |
| 2013/0006529 A1 | 1/2013 | Miyamoto | |
| 2013/0141461 A1* | 6/2013 | Salter et al. | 345/633 |

FOREIGN PATENT DOCUMENTS

| | | |
|---|---|---|
| EP | 2 600 331 A1 | 6/2013 |
| WO | WO 2013/090100 A1 | 6/2013 |

* cited by examiner

*Primary Examiner* — Kenneth B Lee, Jr.
(74) *Attorney, Agent, or Firm* — Birch, Stewart, Kolash & Birch, LLP

(57) ABSTRACT

The present specification relates to a mobile device, a head mounted display (HMD) paired with the mobile device and a method of controlling therefor, and more particularly, to a method of providing a notification for an occurrence of an event from at least one of the mobile device and the HMD based on a position of the mobile device for the HMD.

20 Claims, 12 Drawing Sheets

FIG. 9
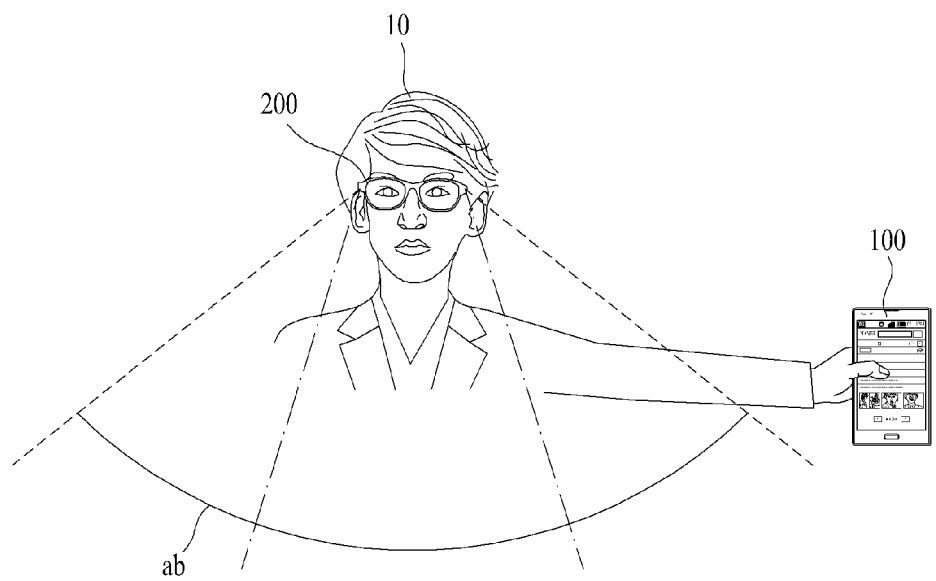
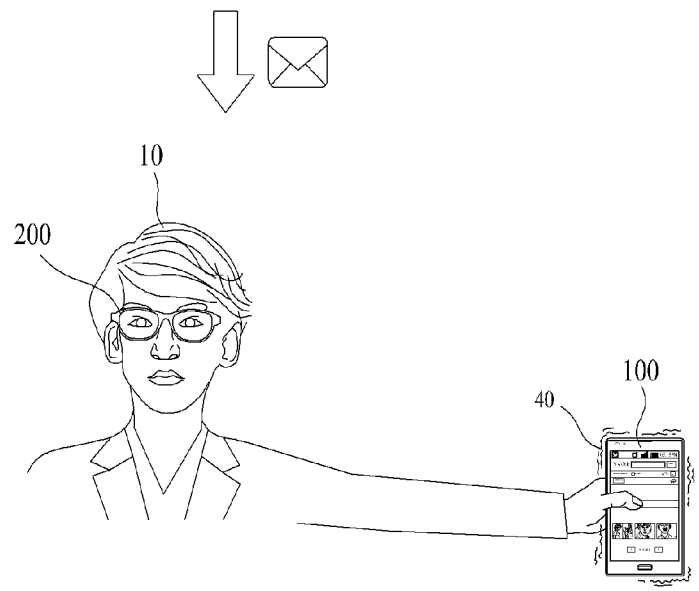

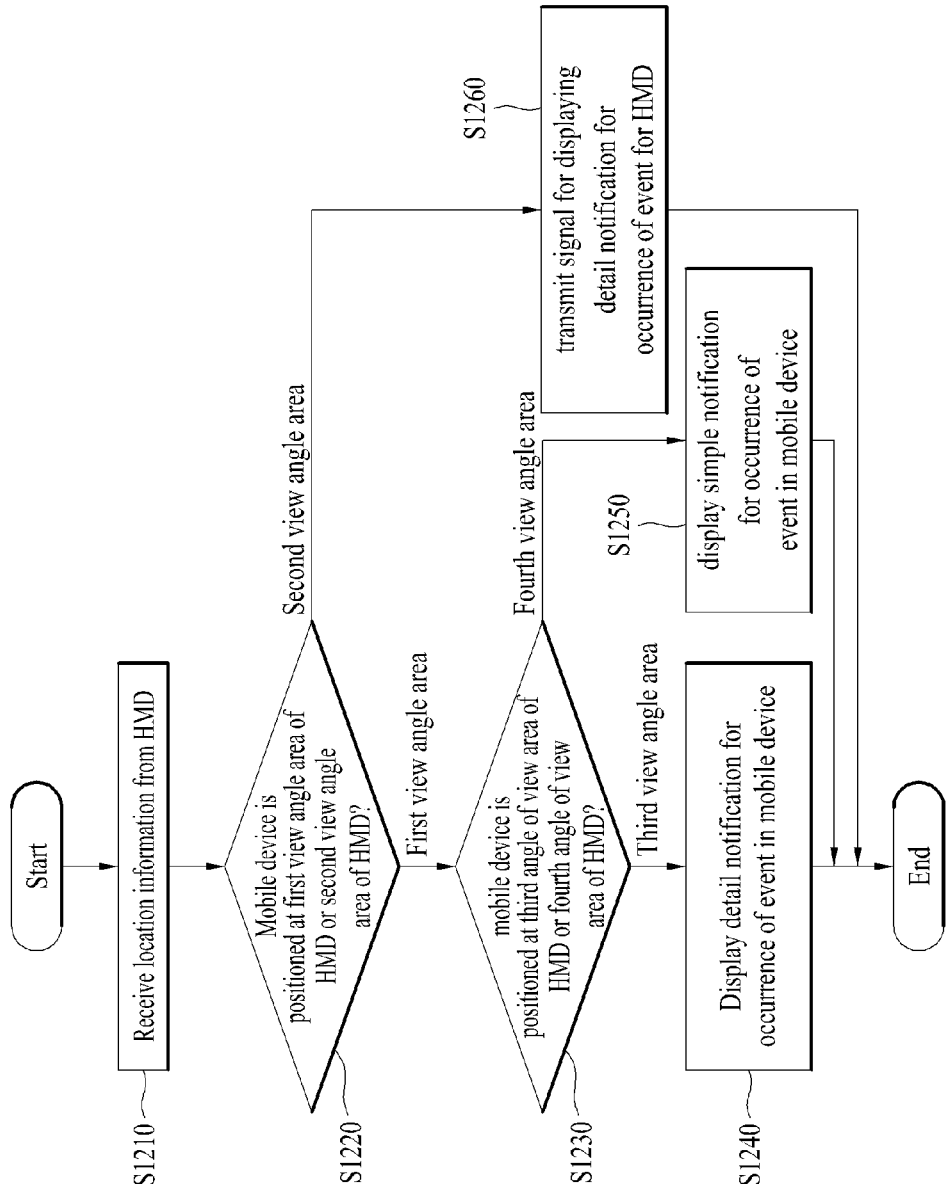

MOBILE DEVICE, HEAD MOUNTED DISPLAY AND METHOD OF CONTROLLING THEREFOR

Pursuant to 35 U.S.C. §119(a), this application claims the benefit of the Korean Patent Application No. 10-2013-0081138, filed on Jul. 10, 2013 which is hereby incorporated by reference as if fully set forth herein.

BACKGROUND OF THE INVENTION

1. Field of the Invention

The present specification relates to a mobile device, a head mounted display (HMD) paired with the mobile device and a method of controlling therefor, and more particularly, to a method of providing a notification for an occurrence of an event from at least one of the mobile device and the HMD based on a position of the mobile device for the HMD.

2. Discussion of the Related Art

Generally, a head mounted display indicates various digital devices enabling a user to receive a multimedia content in a manner of being mounted on the head of the user like glasses. According to a trend of lightening and miniaturizing of a digital device, various wearable computers have been developed so far and the HMD is also widely used. The HMD can provide various conveniences as well as a simple display function to a user in a manner of being combined with an augmented reality technology and an N screen technology.

Meanwhile, the HMD can be used by being connected with various external digital devices. The HMD can output the content of a corresponding external digital device in a manner of performing a communication with the external digital device. And, the HMD can perform such a function as receiving a user input for the external digital device or performing a work interlocked with the corresponding external digital device.

SUMMARY OF THE INVENTION

Accordingly, the present specification is directed to an apparatus and method thereof that substantially obviate one or more problems due to limitations and disadvantages of the related art.

According to one embodiment, an object of the present specification is to determine a device providing a notification for an occurrence of an event based on a position of a mobile device for a HMD.

In case that a mobile device is positioned at the inside of an view angle area of a camera installed in a HMD, when the mobile device is positioned at within a predetermined angle of the view angle area, another object of the present specification is to provide a detail notification by the mobile device.

In case that a mobile device is positioned at the outside of an view angle area of a camera installed in a HMD, another object of the present specification is to provide a notification for an occurrence of an event not by the mobile device but by the HMD.

In case that a display screen of a mobile device is not facing a user wearing a HMD, another object of the present specification is to provide a notification for an occurrence of an event by the HMD.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile device includes a display unit configured to display content, a sensor unit configured to detect an input signal and transmit the detected input signal to a processor, a communication unit configured to transmit and receive data, a camera unit configured to capture an image in front direction, and the processor configured to control the display unit, the sensor unit, the communication unit, and the camera unit, wherein when the mobile device is paired with a head mounted display (HMD) and an event to which a notification to be provided occurs, the processor is further configured to: receive a location information from the HMD, wherein the location information indicates whether the mobile device is positioned at a first view angle area of the HMD, provide a detail notification for an occurrence of the event in the mobile device when the mobile device is positioned at the first view angle area of the HMD, transmit a signal for providing the detail notification for the occurrence of the event to the HMD when the mobile device is positioned at a second view angle area of the HMD, wherein the second view angle area corresponds to an area outside of the first view angle area.

And, according to one embodiment, a head mounted display (HMD) includes a display unit configured to display content, a sensor unit configured to detect an input signal and transmit the detected input signal to a processor, a communication unit configured to transmit and receive a data, a camera unit configured to capture an image in a front direction, and the processor configured to control the display unit, the sensor unit, the communication unit, and the camera unit, wherein the processor is further configured to: pair with a mobile device, sense a position of the mobile device with respect to the HMD, transmit location information, wherein the location information indicates whether the mobile device is positioned at a first view angle area of the HMD, receive a detail notification for an occurrence of an event from the mobile device and configured to provide the detail notification when the mobile device is positioned at a second view angle area of the HMD, wherein the second view angle area corresponds to an area outside of the first view angle area.

And, according to one embodiment, a method of controlling a mobile device includes the steps of when a head mounted display (HMD) is paired with the mobile device and an event to which a notification is to be provided occurs, receiving location information from the HMD, wherein the location information indicates whether the mobile device is positioned at a first view angle area of the HMD, providing a detail notification for an occurrence of the event in the mobile device when the mobile device is positioned at the first view angle area of the HMD, and transmitting a signal for providing the detail notification for the occurrence of the event to the HMD when the mobile device is positioned at a second view angle area of the HMD, wherein the second view angle area corresponds to an area outside of the first view angle area.

And, according to one embodiment, a method of controlling a head mounted display (HMD) includes the steps of pairing with a mobile device, sensing a position of the mobile device with respect to the HMD, transmitting location information, wherein the location information indicates whether the mobile device is positioned at a first view angle area of the HMD, to the mobile device, and receiving a detail notification for an occurrence of an event from the mobile device and providing the detail notification when the mobile device is positioned at a second view angle area, wherein the second view angle area corresponds to an area outside of the first view angle area.

According to one embodiment, a user wearing a HMD can easily receive a notification for an occurrence of an event via a mobile device or an HMD irrespective of whether the mobile device is positioned at a view angle area of a camera installed in the HMD.

According to one embodiment, although a mobile device is positioned at the inside of an view angle area of a HMD, when the content of the mobile device is hard to be recognized at the front of a user wearing the HMD, the user can easily recognize an occurrence of an event via both the mobile device and the HMD.

According to one embodiment, a device easily recognizable by a user among a mobile device and a HMD can provide a notification for an occurrence of an event based on whether the mobile device is positioned at an view angle area of the HMD and a distance between the HMD and the mobile device.

According to one embodiment, although a mobile device is not positioned at the inside of an view angle area of a HMD, when the mobile device is in contact with a body of a user, an occurrence of an event can be notified to the user in a manner of providing a vibration notification.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 is a diagram of a sixth embodiment for providing a notification for an occurrence of an event based on a position of a mobile device and an HMD of the present specification;

FIG. 12 is a flowchart of a method of controlling a mobile device of the present specification.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present specification. Wherever possible, the same reference numbers will be used throughout the drawings to refer to the same or similar parts.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, while the embodiments have been concretely described with reference to the attached diagrams and the contents written on the diagrams, the present specification may be non-restricted or non-limited to the embodiments.

Figure 1:
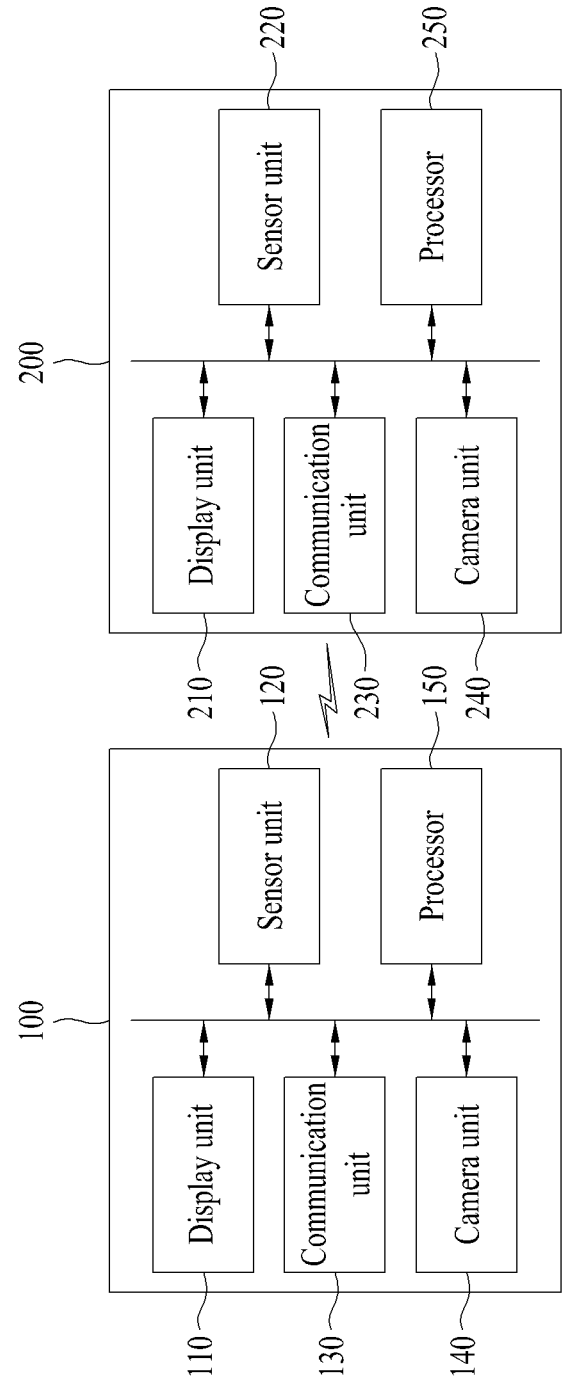
FIG. 1 is a block diagram of a mobile device and an HMD of the present specification.

FIG. 1 is a block diagram of a mobile device and an HMD of the present specification. Referring to FIG. 1, the mobile device 100 can include a display unit 110, a sensor unit 120, a communication unit 130, a camera unit 140, and a processor 150. The head mounted display (HMD) 200 can include a display unit 210, a sensor unit 220, a communication unit 230, a camera unit 240, and a processor 250.

First of all, the mobile device 100 can include such various digital devices capable of displaying an image as a personal digital assistant (PDA), a notebook, a tablet PC, a smart phone, and the like. And the HMD indicates a digital device enabling a user to receive a multimedia content in a manner of being mounted on the head of the user like glasses.

The display unit 110/210 can output an image in a display screen. And, the display unit 110/210 can output an image based on content executed by the processor 150/250 or a control command of the processor 150/250. For instance, the content can include various videos, an image, and the like. And, the content may correspond to a text message in the present specification.

In the present specification, the display unit 110 of the mobile device 100 can display contents in a manner of being situated at the front side of the mobile device 100. And, in the present specification, the display unit 110/210 can provide a detail notification or a simple notification for an occurrence of an event. More specifically, the display unit 110 of the mobile device 100 can display the detail notification or the simple notification via a display screen. Regarding this, it shall be explained again in FIG. 3.

Meanwhile, in the present specification, the HMD 200 can output an image in a various modes. As an example, the HMD 200 can output an image in a see-through mode. In this case, the see-through mode corresponds to a case that the display screen is transparent. The see-through mode indicates a mode capable of using content while a user wearing the HMD 200 is recognizing the surrounding environment. As a different example, the HMD 200 can output an image in a front-light mode. In this case, the front-light mode indicates a mode capable of displaying an image to which a light is reflected without directly projecting to eyes via such a reflector as a mirror.

And, as a further different example, the HMD 200 can output an image in a see-closed mode. In this case, the see-closed mode indicates a mode not capable of seeing an external environment via the display screen and capable of using contents via the display screen. The present specification is explained under an assumption that the HMD 200 displays the detail notification or the simple notification in the see-through mode or the front-light mode. Regarding this, it shall be explained again in FIG. 3.

The sensor unit 120/220 senses a surrounding environment of the device using at least one sensor installed in the HMD 200 and can deliver a sensed result to the processor 250 in a signal form. And, the sensor unit 120/220 senses a user input and can deliver a signal according to a sensed result to the processor 250.

And, the sensor unit 120/220 can include at least one sensing means. As one embodiment, the at least one sensing means can include such a sensing means as a gravity sensor, a terrestrial magnetism sensor, a motion sensor, a gyroscope sensor, an acceleration sensor, an infrared sensor, a tilt (inclination) sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, a grip sensor, and the like.

And, the sensing unit 120/220 is a common name of the aforementioned various sensing means and can deliver sensed results to the processor to enable the processor 150/250 to perform an operation according to the sensed results. The aforementioned sensors may be included in the mobile device 100 or the HMD 200 as a separate element or may be included in at least one element in a manner of being combined.

In the present specification, the sensor unit 120 of the mobile device 100 can sense whether the mobile device 100 is in contact with a user. And, in the present specification, the sensor unit 220 of the HMD 200 can sense whether a user is wearing the HMD 200.

The communication unit 130/230 performs a communication with an external device using various protocols and can transmit and receive a data using the various protocols. And, the communication unit 130/230 can transmit and receive such a digital data as content and the like by accessing a network in wired or wireless. For instance, the communication unit 130/230 can use such a communication standard as WLAN (Wireless LAN) (Wi-Fi), Wibro (Wireless broadband), Wimax (World Interoperability for Microwave Access), HADPA (High Speed Downlink Packet Access), and the like.

In the present specification, the communication unit 130 of the mobile device 100 and the communication unit 230 of the HMD 200 can perform a pairing. In this case, the pairing indicates a connection to transmit and receive a data between the mobile device 100 and the HMD 200. In case of performing the pairing, the mobile device 100 and the HMD 200 perform a communication access and can bilaterally transmit and receive a data. The pairing can be performed by a Bluetooth, Near Field Communication (NFC), and the like. In the present specification, the mobile device 100 and the HMD 200 are explained under an assumption that the mobile device and the HMD are paired with each other.

And, in the present specification, the communication unit 130 of the mobile device 100 can receive location information from the HMD 200. And, the communication unit 130 of the mobile device 100 can transmit a signal providing a detail notification or a simple notification for an occurrence of an event to the HMD 200. Meanwhile, in the present specification, the communication unit 230 of the HMD 200 can transmit location information to the mobile device 100. And, the communication unit 230 of the HMD 200 can receive the detail notification or the simple notification for the occurrence of the event from the mobile device 100.

The camera unit 140/240 can sense an image in a front direction of the mobile device 100 or the HMD 200. In this case, the front direction may indicate a direction to which the camera unit 140 of the mobile device 100 or the camera unit 240 of the HMD 200 is facing. And, the front direction may indicate a direction corresponding to a view of a user wearing the HMD 200. And, the camera unit 240 of the HMD 200 can take a picture of an image in an view angle area, which corresponds to the view of the user wearing the HMD 200, and can provide the image to the processor 250.

In the present specification, the camera unit 240 of the HMD 200 can detect whether the mobile device 100 is situated at the inside of the view angle area of the camera unit 240. Meanwhile, in the present specification, in case that the camera unit 140 of the mobile device 100 and the camera unit 240 of the HMD 200 are activated, a position of the mobile device 100 can be detected by each of the camera units 140/240.

The processor 150/250 is configured to process data, configured to control each of the units of the aforementioned mobile device 100 and the HMD 200, and configured to control data transmission/reception between the units.

In the present specification, when the mobile device 100 is situated at a first view angle area of the HMD 200, the processor 150 of the mobile device 100 is configured to provide a detail notification for an occurrence of an event in the mobile device. And, when the mobile device 100 is situated at a second view angle area of the HMD 200, the processor 150 of the mobile device 100 is configured to transmit a signal for providing the detail notification for an occurrence of an event to the HMD 200.

Meanwhile, in the present specification, when the mobile device is situated at the second view angle area of the HMD 200, the processor 250 of the HMD 200 is configured to receive the detail notification for the occurrence of the event from the mobile device and can provide the detail notification.

Meanwhile, although it is not depicted in FIG. 1, the mobile device 100 and the HMD 200 can include a storage unit and a power unit. The storage unit can store such various digital data as a video, an audio, an image, an application, and the like. The storage unit can store a program configured to process and control the processor and can perform a function of temporarily storing input/output data. For instance, the storage unit can be situated at the inside/outside of the mobile device 100 and the HMD 200.

The power unit is a power source connected to an internal battery or an external power supply of the mobile device 100 or the HMD 200. The power unit can supply power to the mobile device 100 or the HMD 200.

The mobile device 100 and the HMD 200 depicted in FIG. 1 is a block diagram according to one embodiment. Blocks represented in a manner of being separated indicate the logically distinguished elements of the mobile device 100 and the HMD 200. Hence, the elements of the aforementioned mobile device 100 and the HMD 200 can be equipped with a single chip or a plurality of chips according to the design of the device.

As one embodiment of the present specification, operations by which the mobile device 100 and the HMD 200 perform can be controlled by the processor 150/250. For clarity, in the following description and diagrams, these operations are commonly depicted and explained in a manner that the mobile device 100 or the HMD 200 performs/controls the operations.

Figure 2:
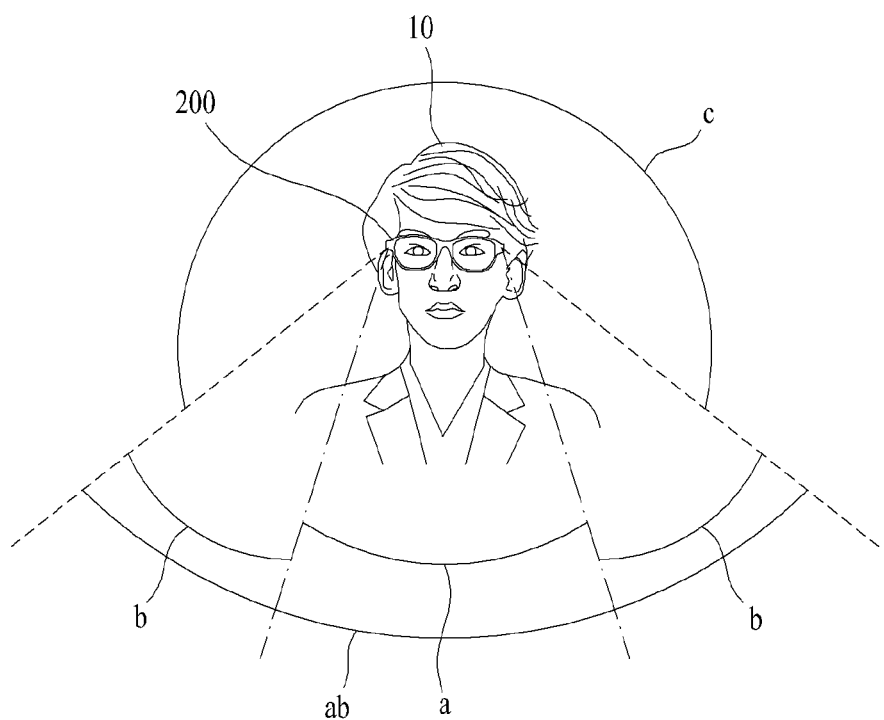
FIG. 2 is a diagram of an view angle area of an HMD of the present specification.

FIG. 2 is a diagram of a view angle area of an HMD of the present specification.

A camera (not depicted) of the HMD 200 may have an view angle area of a predetermined range. In this case, the view angle area indicates a range of a horizontal and vertical viewing angle capable of being included in a screen in case of taking a picture. And, the view angle area of the HMD 200 may indicate a predetermined area corresponding to a view of a user 10 wearing the HMD 200. More specifically, the view angle area includes an area within a prescribed angle in a front direction of the HMD 200. For instance, the prescribed angle may correspond to ±60 degrees on the basis of a lens of a camera (not depicted) installed in the HMD 200. And, the camera (not depicted) of the HMD 200 may be installed in the left, the right, or the middle of the HMD 200.

Referring to FIG. 2, the HMD 200 may have a first view angle area (ab). In this case, the first view angle area (ab) may indicate an area within a prescribed angle in the front direction of the HMD 200. For instance, the prescribed angle may correspond to ±60 degrees on the basis of the lens of the camera (not depicted) installed in the HMD 200. And, the first view angle area (ab) can include a third view angle area (a), which has an angle included in a predetermined angle among the first view angle area (ab), and a fourth view angle area (b), which is not included in the predetermined angle among the first view angle area (ab). For instance, the predetermined angle may correspond to ±30 degrees on the basis of the lens of the camera (not depicted) installed in the HMD 200. In case of the third view angle area (a), since the third view angle area is positioned at the front side of the HMD 200, the user 10 can easily recognize an object and a person positioned in the third view angle area (a) via the HMD 200.

And, referring to FIG. 2, the HMD 200 may have a second view angle area (c). In this case, the second view angle area (c) may correspond to an area having an angle outside of a prescribed angle in the front direction of the HMD 200. For instance, the second view angle area (c) may correspond to the area outside of a range of ±60 degrees on the basis of the lens of the camera (not depicted) installed in the HMD 200. Hence, the user 10 cannot recognize an object and person positioned at the second view angle area (c) via the HMD 200.

Figure 3:
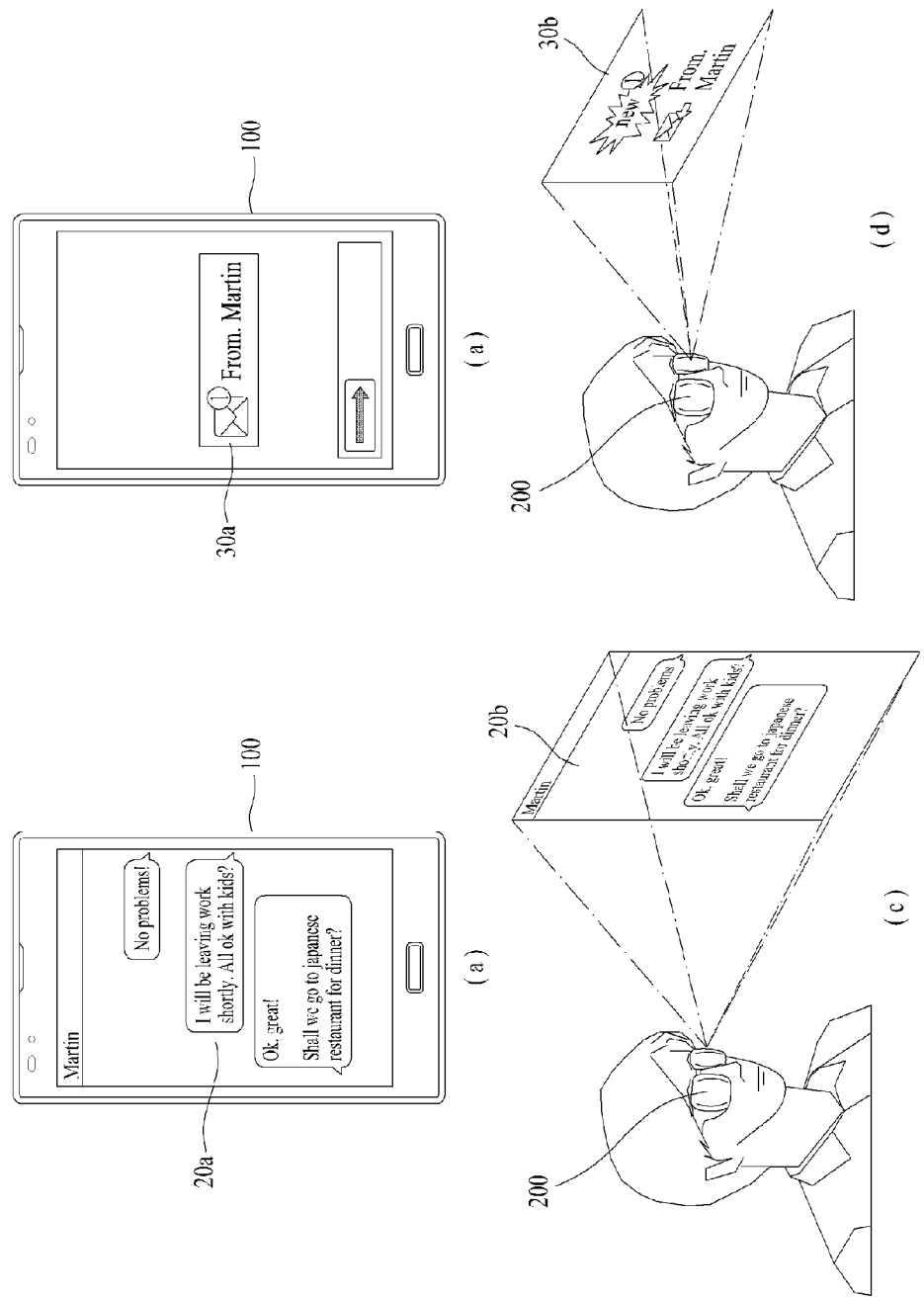
FIG. 3 is a diagram of a notification displayed in a mobile device and an HMD of the present specification.

FIG. 3 is a diagram of a notification displayed in a mobile device and an HMD of the present specification. More specifically, in case that an event to which a notification is necessary to be provided occurs, FIG. 3 indicates a detail notification or a simple notification displayed in the mobile device 100 or the HMD 200.

When an event, which needs a notification to be provided, occurs, the mobile device 100 or the HMD 200 can provide the notification for the occurrence of the event. And, the notification can be provided in case of such an occurrence of an event as receiving a text message, receiving a call, providing an alarm, receiving an SNS message, receiving a mail, and the like. In this case, the notification can include a simple notification providing a fact of an occurrence of an event only and a detail notification providing detail information in a manner of executing a corresponding application for the event occurrence. For instance, when a text message is received, the simple notification may correspond to a notification informing a fact that the text message is received only without informing the content of the text message. And, for instance, when a text message is received, the detail notification may correspond to a notification minutely informing the content of the text message in a manner of executing a text message application.

Referring to FIG. 3(a), when an event of receiving a text message occurs, the mobile device 100 can display a detail notification 20a minutely indicating content of the text message in the display unit. And, referring to FIG. 3(c), when an event of receiving a text message occurs, the HMD 200 can display a detail notification 20b minutely indicating the content of the text message in the front-light mode.

Referring to FIG. 3(b), when an event of receiving a text message occurs, the mobile device 100 can display a simple notification 30a simply indicating the reception of the text message in the display unit. And, referring to FIG. 3(d), when an event of receiving a text message occurs, the HMD 200 can display a simple notification 30b indicating the reception of the text message in the front-light mode.

In the following description, a method of providing a notification for an event occurrence is explained with reference to the embodiments of FIG. 4 to FIG. 9 based on a location relation between the mobile device 100 and the HMD 200. The embodiments of FIG. 4 to FIG. 9 are assumed that the mobile device 100 and the HMD 200 are in a state of being activated. And, the embodiments of FIG. 4 to FIG. 9 are explained under an assumption that the user 10 is in a state of wearing the HMD 200.

Figure 4:
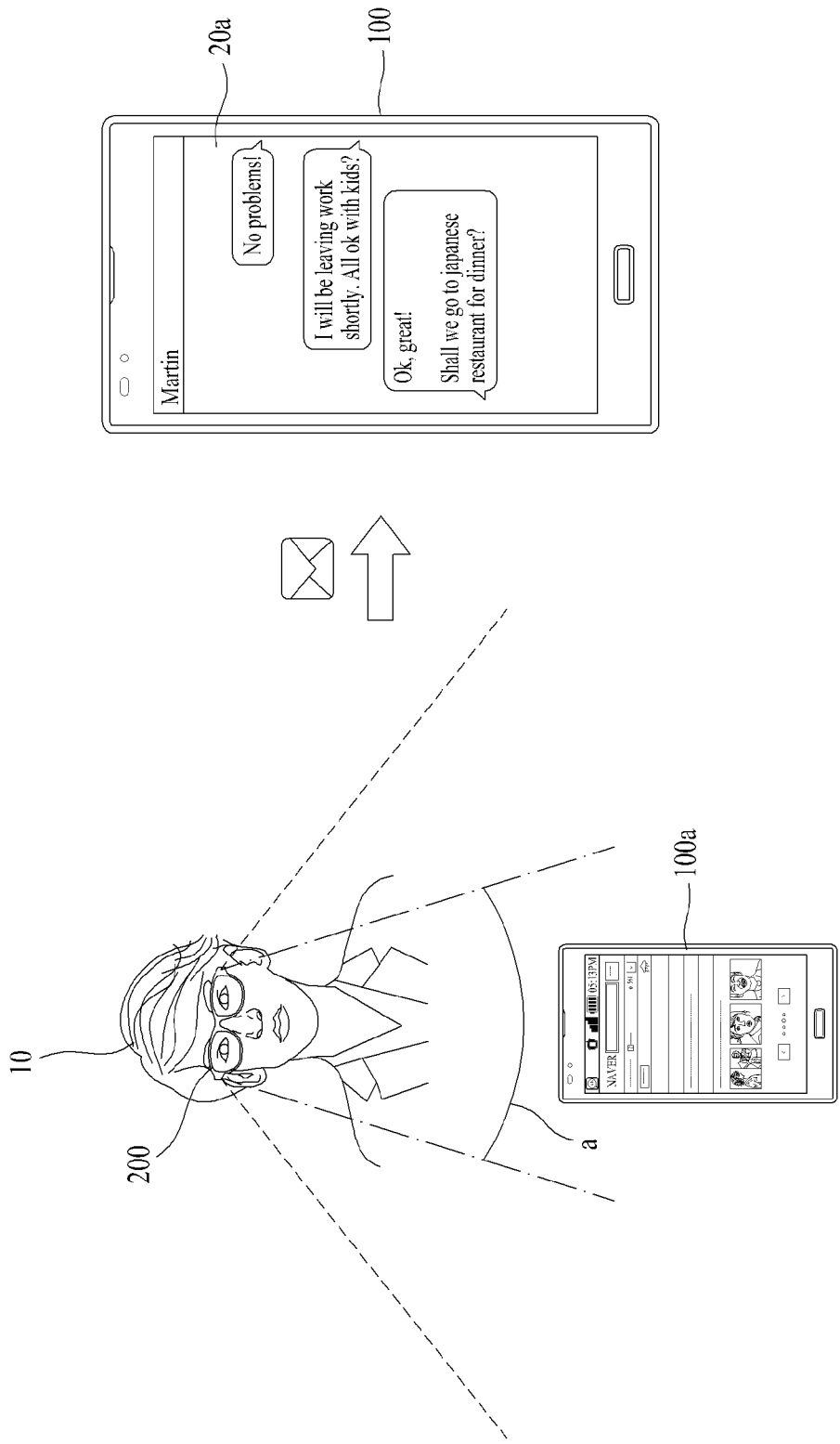
FIG. 4 is a diagram of a first embodiment for providing a notification for an occurrence of an event based on a position of a mobile device and an HMD of the present specification.

FIG. 4 is a diagram of a first embodiment for providing a notification for an occurrence of an event based on a position of a mobile device and an HMD of the present specification. More specifically, in case that the mobile device 100 is situated at a third view angle area (a) of the HMD 200, FIG. 4 indicates that the mobile device 100a provides a notification for the occurrence of the event.

Referring to FIG. 4, the mobile device 100a can be situated at the third view angle area (a) of the HMD 200. In particular, the mobile device 100a can be positioned at the front of a user 10 wearing the HMD 200. And, the display screen of the mobile device 100a can be positioned in a manner of facing the user 10. The location relation between the mobile device 100a and the HMD 200 can be sensed by the camera unit installed in the HMD 200. And, the HMD 200 can transmit the sensed location information of the mobile device 100a to the mobile device 100.

For instance, the HMD 200 can transmit the location information to the mobile device 100a by a request of the mobile device 100a. And, for instance, the HMD 200 can transmit the location information to the mobile device 100a on every prescribed time irrespective of the request of the mobile device 100a. In this case, the sensed location information can indicate whether the mobile device 100a is positioned within the view angle area of the HMD 200.

Meanwhile, the location relation between the mobile device 100a and the HMD 200 can be sensed by a camera unit installed in the mobile device 100a as well as the camera unit installed in the HMD 200. For instance, when both the camera unit of the mobile device 100a and the camera unit of the HMD 200 are activated, the location relation between the mobile device 100a and the HMD 200 can be determined based on at least one of the position of the HMD 200 sensed by the mobile device 100a and the position of the mobile device 100a sensed by the HMD 200.

In this case, in a state that the user 10 is wearing the HMD 200 and the mobile device 100a and the HMD 200 are paired with each other, an event to which a notification is necessary to be provided may occur. For instance, the event to which a notification is necessary to be provided may include receiving a call, receiving a text message, receiving a mail, receiving a social network service (SNS) message, an alarm, and the like. For instance, the event to which a notification is necessary to be provided in FIG. 4 may correspond to the event of receiving a text message. Meanwhile, although it is not depicted in FIG. 4, when the HMD 200 is not wore by the user 10, the mobile device 100 can provide a detail notification 20a for the event occurrence in the mobile device 100.

When an event occurs, the mobile device 100a can determine a device to provide a notification for the occurrence of the event based on the location information received from the HMD 200. For instance, when the mobile device 100a is positioned at the third view angle area (a) of the HMD 200, the mobile device 100a can provide a detail notification 20a for the occurred event in the mobile device 100a. Hence, referring to FIG. 4, the mobile device 100a executes an application related to the text message and can provide the content of the received message on the executed application.

Meanwhile, when the mobile device 100a is positioned at the third view angle area (a) of the HMD 200, the mobile device 100a can control the HMD 200 not to provide the notification for the occurrence of the event. This is because it is more convenient for the user 10 wearing the HMD 200 to receive the notification from the mobile device 100a situated at the front of the user.

Figure 5:
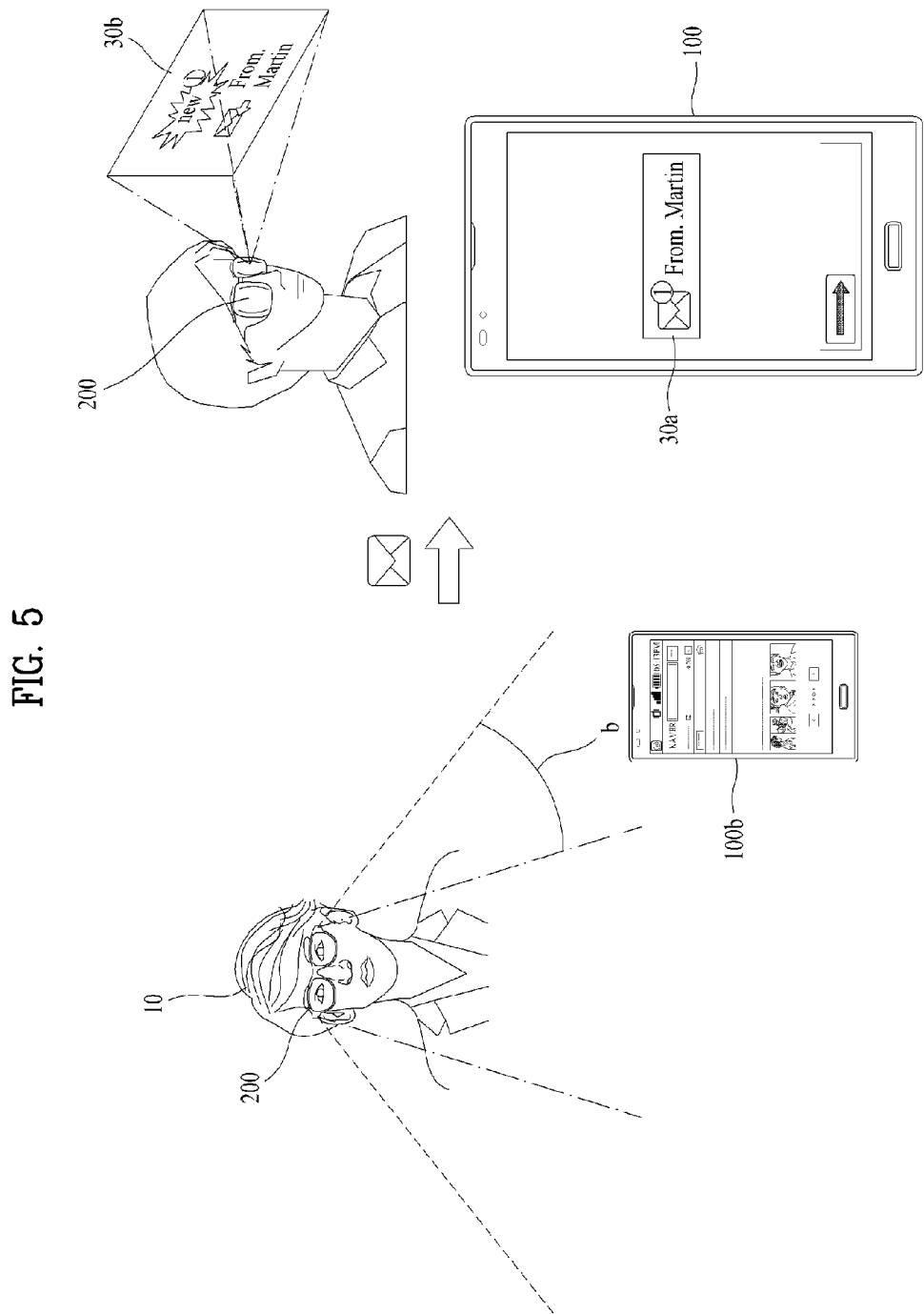
FIG. 5 is a diagram of a second embodiment for providing a notification for an occurrence of an event based on a position of a mobile device and an HMD of the present specification.

FIG. 5 is a diagram of a second embodiment for providing a notification for an occurrence of an event based on a position of a mobile device and an HMD of the present specification. More specifically, when the mobile device 100b is positioned at a fourth view angle area of the HMD 200, FIG. 5 indicates that the mobile device 100b provides a notification for the occurrence of the event.

Referring to FIG. 5, the mobile device 100b can be situated at a fourth view angle area (b) of the HMD 200. In particular, the mobile device 100b can be positioned at the side of the user 10 not the front of the user 10 wearing the HMD 200. And, the display screen of the mobile device 100b can be positioned in a manner of facing the user 10. As mentioned earlier in FIG. 4, the location relation between the mobile device 100b and the HMD 200 can be sensed by the camera unit installed in the HMD 200.

Meanwhile, in a state that the mobile device 100b and the HMD 200 are paired with each other, an event to which a notification is necessary to be provided may occur. The event to which a notification to be provided in FIG. 5 may correspond to the event of receiving a text message. When the event to which a notification to be provided occurs, the mobile device 100b can determine a device to provide the notification for the event occurrence based on the location information received from the HMD 200.

In one embodiment, in case that the mobile device 100b is positioned at the fourth view angle area (b) of the HMD 200, the mobile device 100b can provide a simple notification 30a for the occurrence of the event in the mobile device 100b. Referring to FIG. 5, the mobile device 100b can display a notification indicating a message reception in a state of a lock screen.

In another embodiment, in case that the mobile device 100b is positioned at the fourth view angle (b) of the HMD 200, the mobile device 100b can transmit a signal for displaying a simple notification 30b for the event occurrence to the HMD 200. And, the HMD 200 receives the signal for displaying the simple notification 30b from the mobile device 100b and can provide the simple notification 30b. Referring to FIG. 5, the HMD 200 can display a notification indicating a message reception in the front-light mode.

In particular, in case that the mobile device 100b is positioned at the fourth view angle (b) of the HMD 200, the mobile device 100b provides the simple notification 30a/30b via the mobile device 100b or the HMD 200. This is intended to induce the user 10 to receive detail information on the event in a manner of selecting one of the devices provided with the simple notification.

Figure 6:
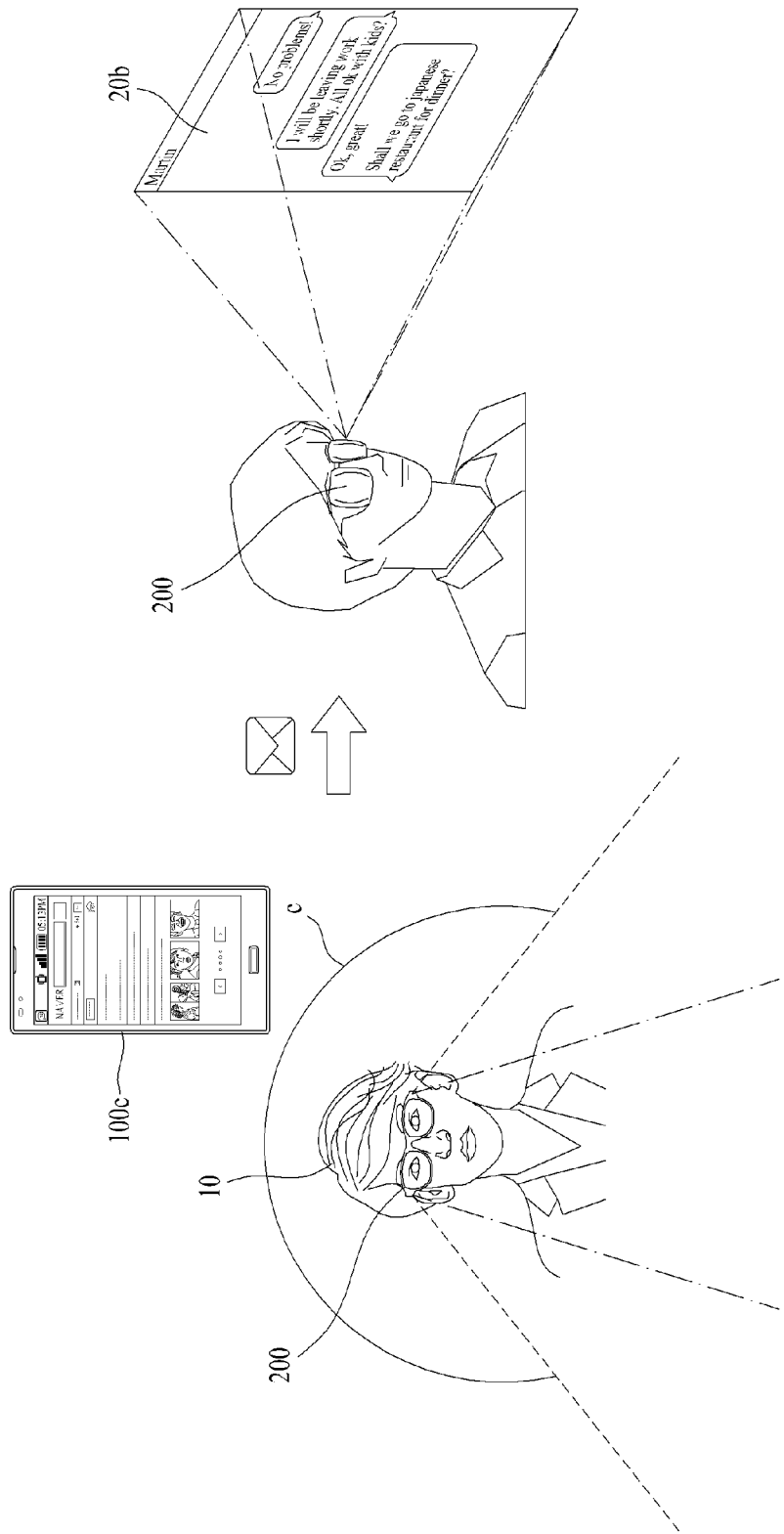
FIG. 6 is a diagram of a third embodiment for providing a notification for an occurrence of an event based on a position of a mobile device and an HMD of the present specification.

FIG. 6 is a diagram of a third embodiment for providing a notification for an occurrence of an event based on a position of a mobile device and an HMD of the present specification. More specifically, when the mobile device 100c is positioned at a second view angle area of the HMD 200, FIG. 5 indicates that the mobile device 100c provides a notification for the occurrence of the event.

Referring to FIG. 6, the mobile device 100c can be situated at a second view angle area (c) of the HMD 200. In this case, the second view angle area (c) can exist at an area outside of the view angle area of a camera installed in the HMD 200 in general. In particular, the second view angle area (c) corresponds to the area not capable of recognizing an object or a person via the camera (not depicted) installed in the front of the HMD 200. The HMD 200 can transmit the location information of the sensed mobile device 100c to the mobile device 100c. Referring to FIG. 6, the HMD 200 can transmit the location information indicating that the mobile device 100c is positioned at the second view angle area (c) to the mobile device 100c.

In a state that the mobile device 100c and the HMD 200 are paired with each other, an event to which a notification is necessary to be provided may occur. For instance, the event to which a notification to be provided in FIG. 6 may correspond to the event of receiving a text message. When the event occurs, the mobile device 100c can determine a device to provide the notification for the event occurrence based on the location information received from the HMD 200.

For instance, in case that the mobile device 100c is positioned at the second view angle area (c) of the HMD 200, the mobile device 100c can transmit a signal for providing a detail notification 20b for the event occurrence to the HMD 200. In this case, the HMD 200 receives the signal for providing the detail notification 20b for the event occurrence from the mobile device 100c and can provide the detail notification 20b. Hence, referring to FIG. 6, the HMD 200 executes an application related to the text message and can display the content of the message received from the executed application.

Meanwhile, when the mobile device 100a is positioned at the second view angle area (c) of the HMD 200, the mobile device 100a can control the mobile device 100c not to provide the notification for the occurrence of the event. This is because it is more convenient for the user 10 to receive the notification from the HMD 200 compared to the mobile device 100c in a state that the mobile device is not recognized by the HMD 200.

And, in case that the mobile device 100c is positioned at the second view angle area (c) of the HMD 200, the mobile device 100c can identify an ID of the HMD 200 and can determine whether a signal for providing a notification is transmitted to the HMD 200 based on the identified ID of the HMD 200. For instance, when the ID of the HMD 200 corresponds to a predetermined ID, the mobile device 100c can transmit the signal for providing the detail notification 20b for the event to the HMD 200. And, for instance, when the ID of the HMD 200 does not correspond to the predetermined ID, the mobile device 100c can provide the detail notification 20a for the event occurrence in the mobile device 100c.

Figure 7:
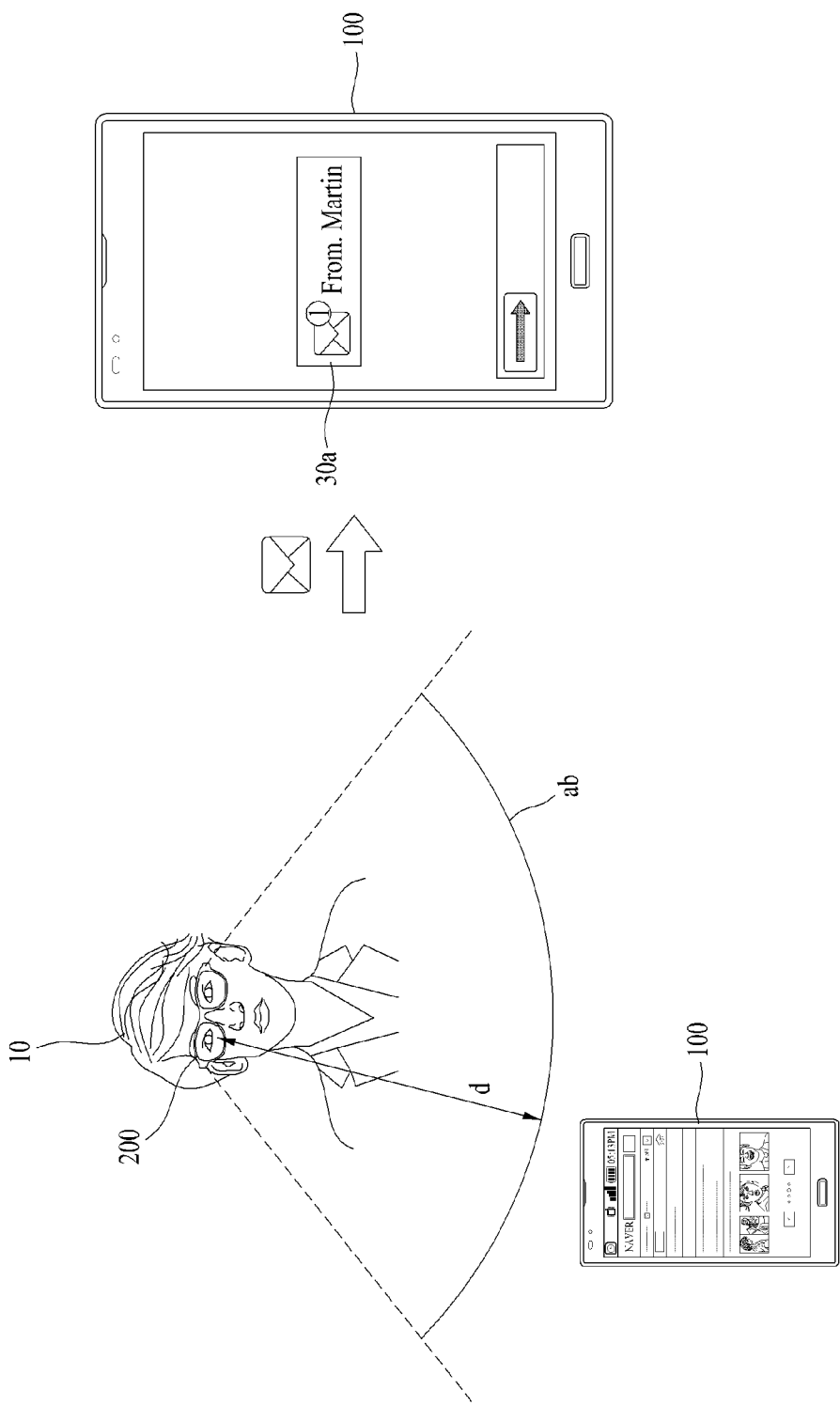
FIG. 7 is a diagram of a fourth embodiment for providing a notification for an occurrence of an event based on a position of a mobile device and an HMD of the present specification.

FIG. 7 is a diagram of a fourth embodiment for providing a notification for an occurrence of an event based on a position of a mobile device and an HMD of the present specification. More specifically, when the mobile device 100 is positioned at the first view angle area of the HMD 200, FIG. 7 indicates that the mobile device 100 provides a notification for the occurrence of the event.

First of all, the HMD 200 can sense location information of a mobile device 100 paired with the HMD. In this case, the location information can include whether the mobile device 100 is positioned at the first view angle area (ab) of the HMD 200 and a distance between the mobile device 100 and the HMD 200. Referring to FIG. 7, the mobile device 100 can be situated at the first view angle area (ab) of the HMD 200. And, the mobile device 100 can be positioned at the outside of a predetermined distance range (d) from the HMD 200. In FIG. 7, the HMD 200 can transmit the location information indicating that the mobile device 100 is positioned within the first view angle area (ab) and is positioned at the outside of the predetermined distance range (d) to the mobile device 100.

In a state that the mobile device 100 and the HMD 200 are paired with each other, the mobile device 100 can detect an occurrence of an event to which a notification to be provided. When the event occurs, the mobile device 100 can determine a device to provide the notification for the event occurrence based on the location information received from the HMD 200.

In one embodiment, as depicted in FIG. 7, in case that the mobile device 100 is positioned within the first view angle area (ab) of the HMD 200 and the mobile device 100 is not positioned in the predetermined distance range (d) from the HMD 200, the mobile device 100 can provide a simple notification 30a for the event occurrence in the mobile device 100. This is because when the mobile device 100 is positioned at a position far from the HMD 200 although the display device is positioned within the first view angle area (ab), the user 10 may be difficult to recognize a detail notification displayed in the mobile device 100. Hence, the mobile device 100 informs the user 10 of the event occurrence in a manner of providing the simple notification and the mobile device can induce the user 10 to minutely receive the occurred event via the mobile device 100 or the HMD 200.

In particular, as shown in FIG. 2, in case that the mobile device 100 is positioned within the third view angle area (a) of the HMD 200 and the mobile device 100 is not positioned in the predetermined distance range (d) from the HMD, the mobile device can provide the simple notification 30a for the event occurrence in the mobile device 100.

And, although it is not depicted in FIG. 7, in case that the mobile device 100 is positioned within the first view angle area (ab) of the HMD 200 and the mobile device 100 is not positioned in the predetermined distance range (d) from the HMD 200, the mobile device 100 can transmit a signal for providing a simple notification 30b for the event occurrence to the HMD 200. And, the HMD 200 receives the simple notification 30b for the event occurrence from the mobile device 100 and can provide the simple notification 30b. By doing so, it is able to induce the user 10 to minutely receive the event occurrence.

In another embodiment, although it is not depicted in FIG. 7, in case that the mobile device 100 is positioned within the first view angle area (ab) of the HMD 200 and the mobile device 100 is positioned in the predetermined distance range (d) from the HMD 200, the mobile device 100 can provide a detail notification 20a for the event occurrence in the mobile device 100. This is because the mobile device 100 is positioned at a point where the user 10 wearing the HMD 200 can easily recognize the mobile device 100.

And, in case that the mobile device 100 is positioned at the second view angle area (not depicted) of the HMD 200, the mobile device 100 can transmit a signal for providing a detail notification 20b for an event occurrence to the HMD 200 irrespective of the distance between the mobile device 100 and the HMD 200. Hence, the HMD 200 receives the signal for providing the detail notification for the event occurrence from the mobile device 100 and can provide the detail notification 20b.

Figure 8:
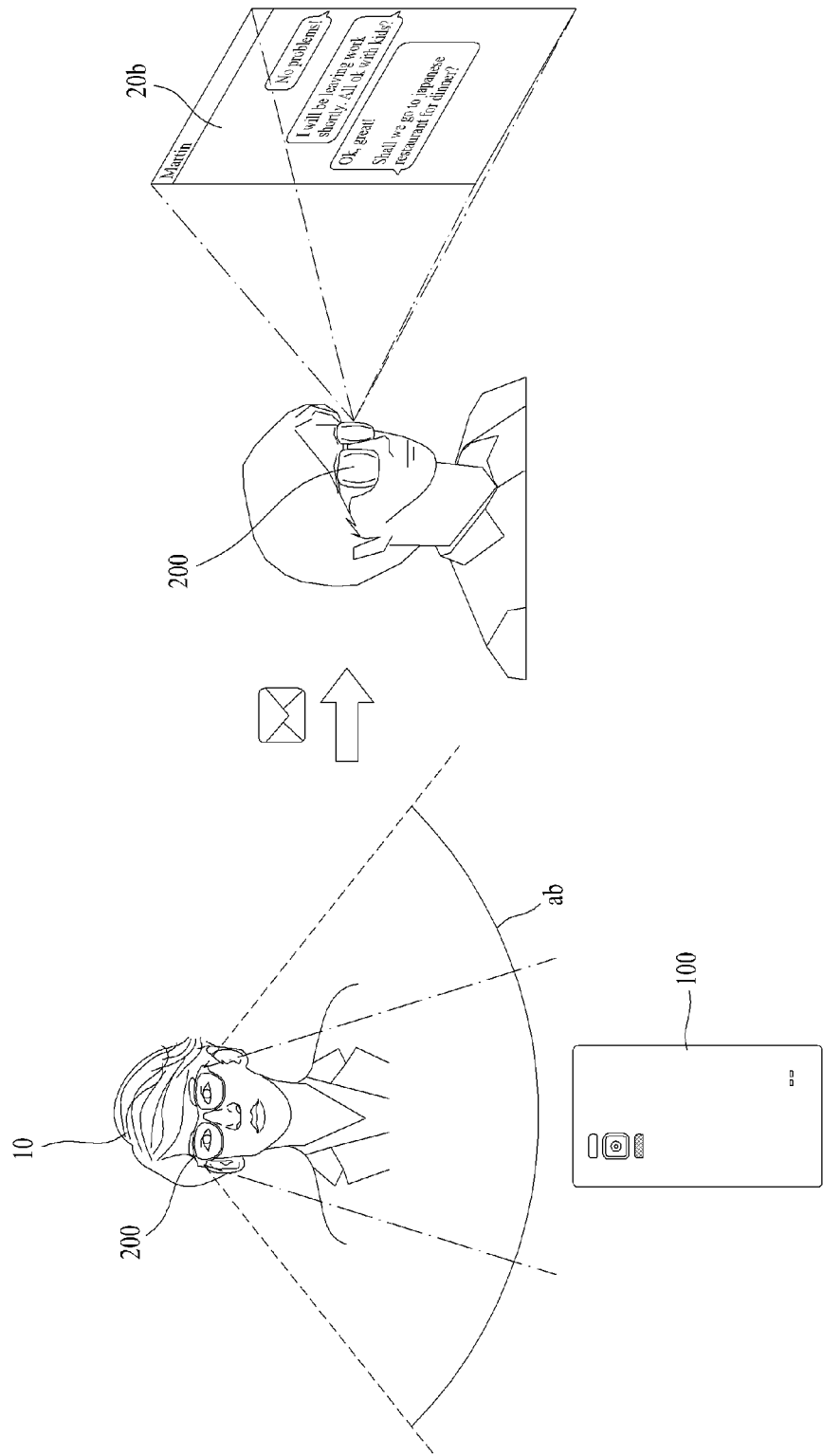
FIG. 8 is a diagram of a fifth embodiment for providing a notification for an occurrence of an event based on a position of a mobile device and an HMD of the present specification.

FIG. 8 is a diagram of a fifth embodiment for providing a notification for an occurrence of an event based on a position of a mobile device and an HMD of the present specification. More specifically, when a display screen of the mobile device 100 is not facing a user 10 wearing the HMD 200, FIG. 8 indicates that the mobile device 100 provides the notification for the occurrence of the event.

First of all, the HMD 200 can sense location information of the mobile device paired with the HMD. In this case, the location information can indicate whether the mobile device 100 is positioned within the first view angle area of the HMD 200. Referring to FIG. 7, the mobile device 100 is positioned within the first view angle (ab) of the HMD 200. Hence, the HMD 200 can transmit the location information indicating that the mobile device 100 is positioned within the first view angle area (ab) to the mobile device 100.

Meanwhile, as depicted in FIG. 8, a backside of the mobile device 100 can face the user 10 wearing the HMD 200. In particular, a front side at which the display screen of the mobile device is situated may not be recognized by the user 10. In this case, although the mobile device is positioned near the user 10, the user 10 cannot receive content from the mobile device 100.

Hence, as shown in FIG. 8, when an event to which a notification is necessary to be provided occurs, the mobile device 100 can transmit a signal for providing the notification for the event to the HMD 200. And, the HMD 200 receives the notification for the event and can provide the notification for the event. In this case, the notification may correspond to either a detail notification or a simple notification. For instance, referring to FIG. 8, in case that the HMD 200 provides the detail notification, detail contents for the occurred event can be provided to the user 10 via the HMD 200. And, for instance, in case that the HMD 200 provides the simple notification, the user 10 can receive the detail contents for the occurred event in a manner of making the mobile device 100 face the user.

FIG. 9 is a diagram of a sixth embodiment for providing a notification for an occurrence of an event based on a position of a mobile device and an HMD of the present specification. More specifically, when the mobile device 100 is in contact with the user 10, FIG. 9 indicates that the mobile device 100 provides a notification for the occurrence of the event.

First of all, referring to FIG. 9, the mobile device can be positioned at the outside of the first view angle area (ab). In particular, as shown in FIG. 2, the mobile device 100 can be positioned at the second view angle area of the HMD 200. In this case, as mentioned earlier in FIG. 6, the mobile device 100 can transmit a detail notification for an occurrence of an event to the HMD 200.

Meanwhile, the mobile device 100 can detect that the mobile device is in contact with a user 10. For instance, referring to FIG. 9, a hand of the user 10 holding the mobile device 100 can be positioned at the outside of the first view angle area (ab). And, for instance, an arm of the user 10 holding the mobile device 100 can be positioned in a manner of facing downward. In this case, the mobile device 100 can provide a vibration notification 40 to the mobile device 100, which is in contact with the user 10. Hence, the user 10 not only receives a detail notification for an occurrence of an event via the HMD 200 but also easily recognizes the occurrence of the event via the vibration notification 40 provided by the mobile device 100.

Figure 10:
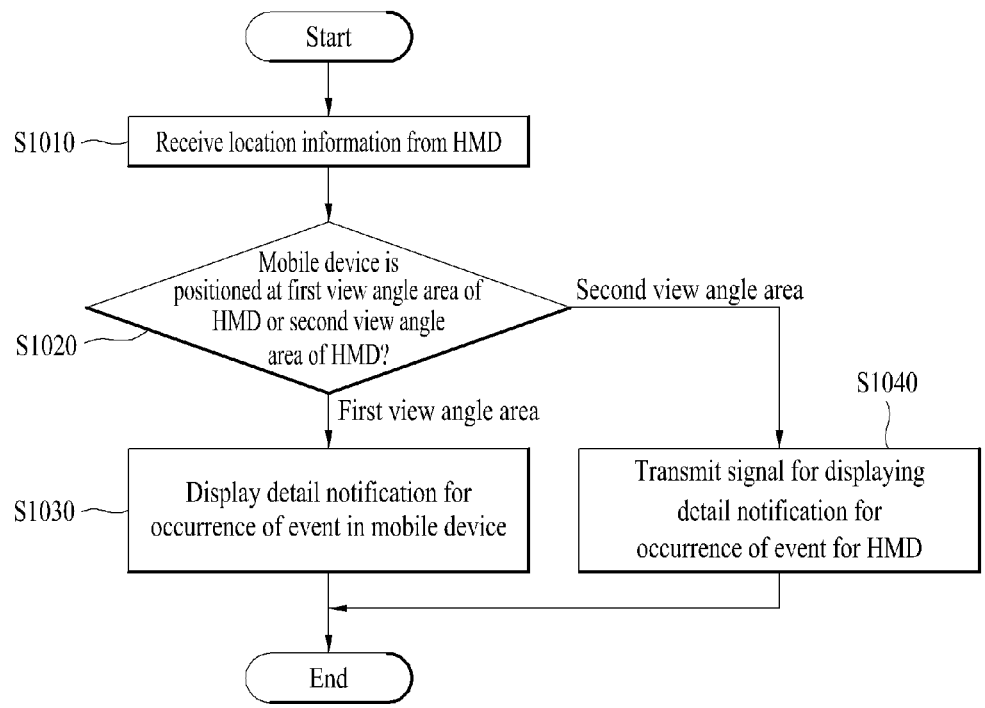
FIG. 10 is a flowchart of a method of controlling a mobile device of the present specification.

FIG. 10 is a flowchart of a method of controlling a mobile device of the present specification. Each step of FIG. 10 explained in the following description can be controlled by a processor 150 of the mobile device 100 depicted in FIG. 1.

First of all, the mobile device can receive location information from the HMD [S1010]. Regarding this, as mentioned earlier in FIG. 4, assume that the mobile device is paired with the HMD and an event to which a notification to be provided has occurred. In this case, the location information may correspond to the information indicating whether the mobile device is positioned at the first view angle area of the HMD. And, as mentioned earlier in FIG. 2, the first view angle area indicates an area corresponding to an angle of a predetermined range where the camera unit installed in the HMD is able to sense. And, as mentioned earlier in FIG. 7, the location information may indicate a distance between the mobile device and the HMD.

Subsequently, the mobile device can determine whether the mobile device is positioned at the first view angle area of the HMD or a second view angle area of the HMD [S1020]. More specifically, the mobile device can recognize a position of the mobile device for the HMD based on the location information received from the HMD. In this case, the second view angle area may correspond to an area outside of the first view angle area.

In the step S1020, when the mobile device is positioned at the first view angle area of the HMD, the mobile device can display a detail notification for an occurrence of an event in the mobile device [S1030]. In this case, as mentioned earlier in FIG. 3, the detail notification may correspond to a notification minutely indicating information on the occurrence of the event in a manner of executing a corresponding application.

Regarding this, as mentioned earlier in FIG. 7, when the distance between the mobile device and the HMD corresponds to a predetermined distance range, the mobile device can provide a detail notification for the occurrence of the event in the mobile device. And, when the distance between the mobile device and the HMD does not correspond to the predetermined distance range, the mobile device can provide a simple notification for the occurrence of the event in the mobile device. And, when the distance between the mobile device and the HMD does not correspond to the predetermined distance range, the mobile device can transmit a signal for providing the simple notification for the occurrence of the event to the HMD.

And, as mentioned earlier in FIG. 8, when a display screen of the mobile device is not facing a user, the mobile device can transmit a signal for providing a notification, which indicates an occurrence of an event, to the HMD. In this case, the notification may correspond to either a simple notification or a detail notification.

Meanwhile, in the step S1020, when the mobile device is positioned at the second view angle area of the HMD, the mobile device can transmit a signal for displaying a detail notification for an occurrence of an event to the HMD [S1040]. As mentioned earlier in FIG. 6, in this case, the HMD receives the detail notification for the occurrence of the event and can provide the detail notification. Regarding this, as mentioned earlier in FIG. 9, when the mobile device is in contact with a body of a user, the mobile device can provide a vibration notification for the occurrence of the event.

And, as mentioned earlier in FIG. 6, when the mobile device is positioned at the second view angle area of the HMD, the mobile device identifies an ID of the HMD and can determine whether a signal for providing a notification to the HMD is transmitted based on the identified ID of the HMD. For instance, when the ID of the HMD corresponds to a predetermined ID, the mobile device can transmit a signal for providing a detail notification for an event to the HMD. And, for instance, when the ID of the HMD does not correspond to the predetermined ID, the mobile device can provide the detail notification for the occurrence of the event in the mobile device.

Figure 11:
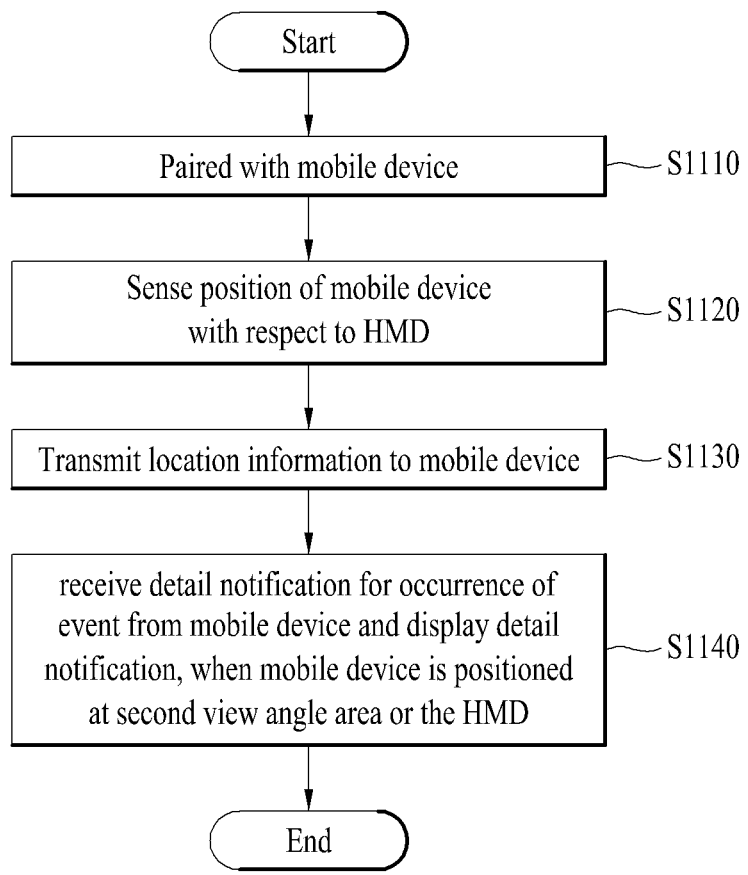
FIG. 11 is a flowchart of a method of controlling an HMD of the present specification.

FIG. 11 is a flowchart of a method of controlling an HMD of the present specification. Each step of FIG. 11 explained in the following description can be controlled by the processor 250 of the HMD 200 depicted in FIG. 1.

First of all, the HMD can be paired with the mobile device [S1110]. As mentioned earlier in FIG. 1, a pairing indicates a connection to transmit and receive a data between the mobile device and the HMD. In case of performing the pairing, the mobile device and the HMD perform a communication access and can bilaterally transmit and receive a data. The pairing can be performed by a Bluetooth, Near Field Communication (NFC), and the like.

Subsequently, the HMD can sense a position of the mobile device for the HMD [S1120]. As mentioned earlier in FIG. 1, the HMS can sense the position of the mobile device via the camera unit installed in the HMD. Meanwhile, as mentioned earlier in FIG. 4, location relation between the mobile device and the HMD can be sensed by the camera unit installed in the mobile device as well as the camera unit installed in the HMD. For instance, when both the camera of the mobile device and the camera unit of the HMD are activated, the location relation between the mobile device and the HMD can be determined based on at least one of the position of the HMD sensed by the mobile device 100a and the position of the mobile device 100a sensed by the HMD 200.

Subsequently, the HMD can transmit location information to the mobile device [S1130]. As mentioned earlier in FIG. 4, for instance, the HMD can transmit the location information to the mobile device by a request of the mobile device. And, for instance, the HMD can transmit the location information to the mobile device on every prescribed time irrespective of the request of the mobile device.

Subsequently, when the mobile device is positioned at the second view angle area of the HMD, the HMD receives a detail notification for an occurrence of an event from the mobile device and can display the detail notification [S1140]. As mentioned earlier in FIG. 6, when the mobile device is positioned at the second view angle area of the HMD, because it is easier for a user to recognize the occurrence of the event via the HMD.

FIG. 12 is a flowchart of a method of controlling a mobile device of the present specification. Each step of FIG. 12 explained in the following description can be controlled by the processor 150 of the mobile device 100 depicted in FIG. 1. In the embodiment of FIG. 12, explanation on a part identical or corresponding to the embodiment of FIG. 10 is omitted.

First of all, the mobile device can receive location information from the HMD [S1210]. Subsequently, the mobile device can determine whether the mobile device is positioned at the first view angle area of the HMD or the second view angle area of the HMD [S1220].

In the step S1220, when it is determined that the mobile device is positioned at the first view angle area of the HMD, the mobile device can determine whether the mobile device is positioned at a third view angle area of the HMD or a fourth view angle area of the HMD [S1230]. As mentioned earlier in FIG. 2, in this case, the third view angle area may indicate an area positioned at the inside of a predetermined angle among the first view angle area. And, the fourth view angle area may indicate an area positioned at the outside of the predetermined angle among the first view angle area.

In the step of S1230, if it is determined that the mobile device is positioned at the third view angle area of the HMD, the mobile device can display a detail notification for an occurrence of an event in the mobile device [S1240]. Meanwhile, in the step of S1230, when it is determined that the mobile device is positioned at the fourth view angle area of the HMD, the mobile device can display a simple notification for the occurrence of the event in the mobile device [S1250]. And, when it is determined that the mobile device is positioned at the fourth view angle area of the HMD, the mobile device can transmit a signal for providing the simple notification for the occurrence of the event to the HMD. As mentioned earlier in FIG. 5, it is able to induce a user to receive detail information from the mobile device or the HMD via the simple notification provided by the mobile device or the HMD.

And, in the step of S1220, when the mobile device is positioned at the second view angle area of the HMD, the mobile device can transmit a signal for displaying a detail notification for an occurrence of an event to the HMD [S1260].

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A mobile device, a head mounted display and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a mobile device, a head mounted display and a method of controlling therefor of the present specification can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, to implement in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on the both of the inventions can be complementally applied, if necessary.

What is claimed is:

1. A mobile device, comprising:
a display unit configured to display content;
a communication unit configured to transmit and receive data;
a camera unit configured to capture an image in a front direction; and
a processor configured to control the display unit, the communication unit, and the camera unit,
wherein when the mobile device is paired with a head mounted display (HMD) and an event occurs for which a notification is to be provided, wherein the notification includes a simple notification providing a simple information of an occurrence of the event or a detail notification providing a detail information of the occurrence of the event,
the processor is further configured to:
receive location information from the HMD, wherein the location information indicates whether the mobile device is positioned within a view angle area of the HMD,
provide, at the mobile device, the simple notification or the detail notification for the occurrence of the event when the mobile device is positioned within the first view angle area of the HMD,
transmit a signal for providing the detail notification for the occurrence of the event to the HMD when the mobile device is positioned within a second view angle area of the HMD, wherein the second view angle area corresponds to an area outside of the first view angle area.

2. The mobile device of claim 1, wherein the first view angle area comprises a third view angle area positioned inside of a predetermined angle within the first view angle area of the HMD and a fourth view angle area positioned outside of the predetermined angle within the first view angle area.

3. The mobile device of claim 2, wherein the processor is further configured to provide, at the mobile device, the detail notification for the occurrence of the event when the mobile device is positioned within the third view angle area of the HMD, and
provide, at the mobile device, a simple notification for the occurrence of the event when the mobile device is positioned within the fourth view angle area of the HMD.

4. The mobile device of claim 3, wherein the processor is further configured to transmit a signal for providing the simple notification for the occurrence of the event to the HMD, when the mobile device is positioned within the second view angle area of the HMD.

5. The mobile device of claim 1, wherein the location information comprises a distance between the mobile device and the HMD.

6. The mobile device of claim 5, wherein the processor is further configured to provide, at the mobile device, the detail notification for the occurrence of the event when the distance between the mobile device and the HMD corresponds to a predetermined distance range, and provide, at the mobile device, the simple notification for the occurrence of the event when the distance between the mobile device and the HMD does not correspond to the predetermined distance range.

7. The mobile device of claim 6, wherein the processor is further configured to transmit a signal for providing the simple notification for the occurrence of the event to the HMD when the distance between the mobile device and the HMD does not correspond to the predetermined distance range.

8. The mobile device of claim 6, wherein the mobile device is positioned within the first view angle area of the HMD.

9. The mobile device of claim 1, wherein the processor is further configured to transmit a signal for providing a notification, which indicates an occurrence of the event, to the HMD, when a display screen of the mobile device is not facing a user.

10. The mobile device of claim 9, wherein the notification corresponds to the detail notification or the simple notification.

11. The mobile device of claim 9, wherein the mobile device is positioned within the first view angle of the HMD.

12. The mobile device of claim 1, wherein the HMD is in a wearing mode.

13. The mobile device of claim 1, wherein the processor is further configured to provide, at the mobile device, the detail notification for the occurrence of the event when the HMD is in a non-wearing mode.

14. The mobile device of the claim 1, further comprising:
a sensor unit configured to detect an input signal and transmit the detected input signal to the processor,
wherein the processor is further configured to provide, at the mobile device, a vibration notification for the occurrence of the event when the mobile device is in contact with a user.

15. The mobile device of claim 14, wherein the mobile device is positioned within the second view angle area of the HMD.

16. The mobile device of claim 1, wherein the processor is further configured to identify an identification (ID) of the HMD,
transmit a signal for providing the detail notification for the event to the HMD when the ID of the HMD corresponds to a predetermined ID, and
provide, at the mobile device, the detail notification for the occurrence of the event when the ID of the HMD does not correspond to the predetermined ID.

17. The mobile device of claim 16, wherein the mobile device is positioned within the second view angle area of the HMD.

18. A head mounted display (HMD), comprising:
a display unit configured to display content;
a communication unit configured to transmit and receive data;
a camera unit configured to capture an image in a front direction; and
a processor configured to control the display unit, the communication unit, and the camera unit,
wherein the processor is further configured to:
pair with a mobile device,
sense a position of the mobile device with respect to the HMD,
transmit location information, wherein the location information indicates whether the mobile device is positioned within a first view angle area of the HMD,
receive a detail notification for a notification of an occurrence of an event from the mobile device and provide the detail notification when the mobile device is positioned within a second view angle area of the HMD, wherein the second view angle area corresponds to an area outside of the first view angle area,
wherein the notification includes a simple notification providing a simple information of the occurrence of the event or the detail notification providing a detail information of the occurrence of the event.

19. A method of controlling a mobile device, the method comprising:
when a head mounted display (HMD) is paired with the mobile device and an event occurs for which a notification is to be provided, wherein the notification includes a simple notification providing a simple information of an occurrence of the event and a detail notification providing a detail information of the occurrence of the event,
receiving location information from the HMD, wherein the location information indicates whether the mobile device is positioned within a first view angle area of the HMD;
providing, at the mobile device, the detail notification for the occurrence of the event when the mobile device is positioned within the first view angle area of the HMD; and
transmitting a signal for providing the detail notification for the occurrence of the event to the HMD when the mobile device is positioned within a second view angle area of the HMD, wherein the second view angle area corresponds to an area outside of the first view angle area.

20. A method of controlling a head mounted display (HMD), the method comprising:
pairing with a mobile device;
sensing a position of the mobile device with respect to the HMD;
transmitting location information to the mobile device, wherein the location information indicates whether the mobile device is positioned within a first view angle area of the HMD; and
receiving a detail notification for a notification of an occurrence of an event from the mobile device and providing the detail notification when the mobile device is positioned within a second view angle area, wherein the second view angle area corresponds to an area outside of the first view angle area,
wherein the notification includes a simple notification providing a simple information of the occurrence of the event or the detail notification providing a detail information of the occurrence of the event.

* * * * *